No. 808,831. PATENTED JAN. 2, 1906.
S. J. FOWLER.
STAND PIPE AND CONNECTION FOR GAS RETORTS.
APPLICATION FILED AUG. 31, 1905.
3 SHEETS—SHEET 2.
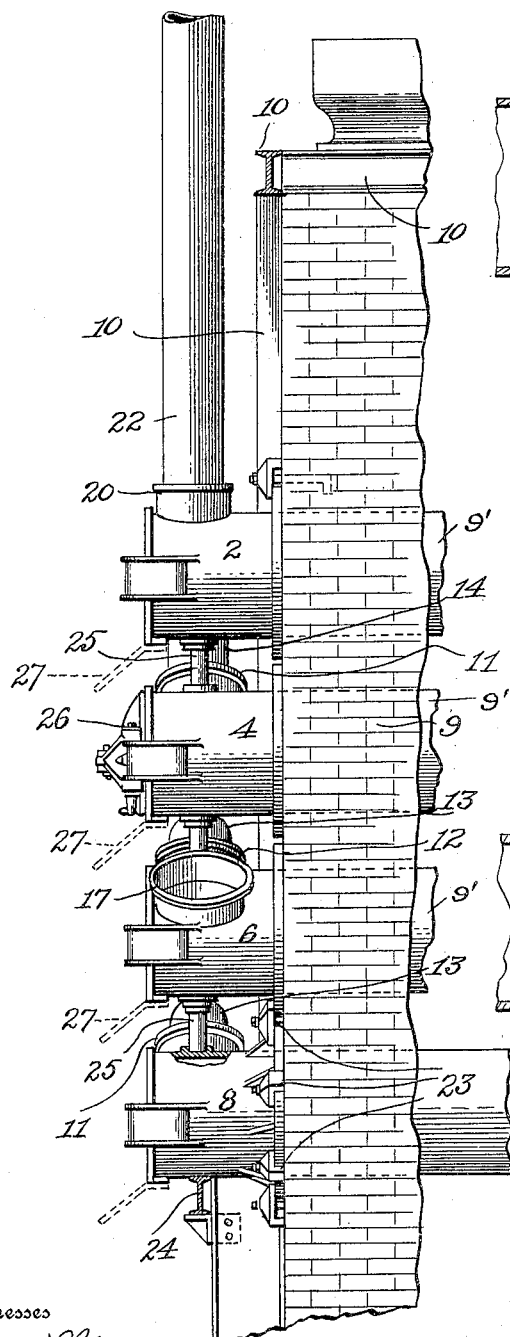
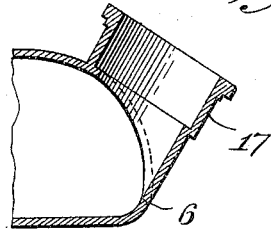
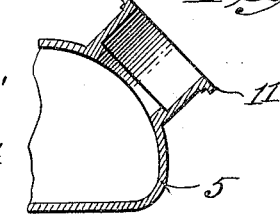
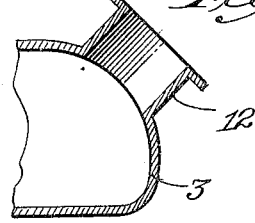
Witnesses
Edwin L. Yewell
John H. Hall
Inventor
Samuel J. Fowler
By W. Schoenborn
Attorney

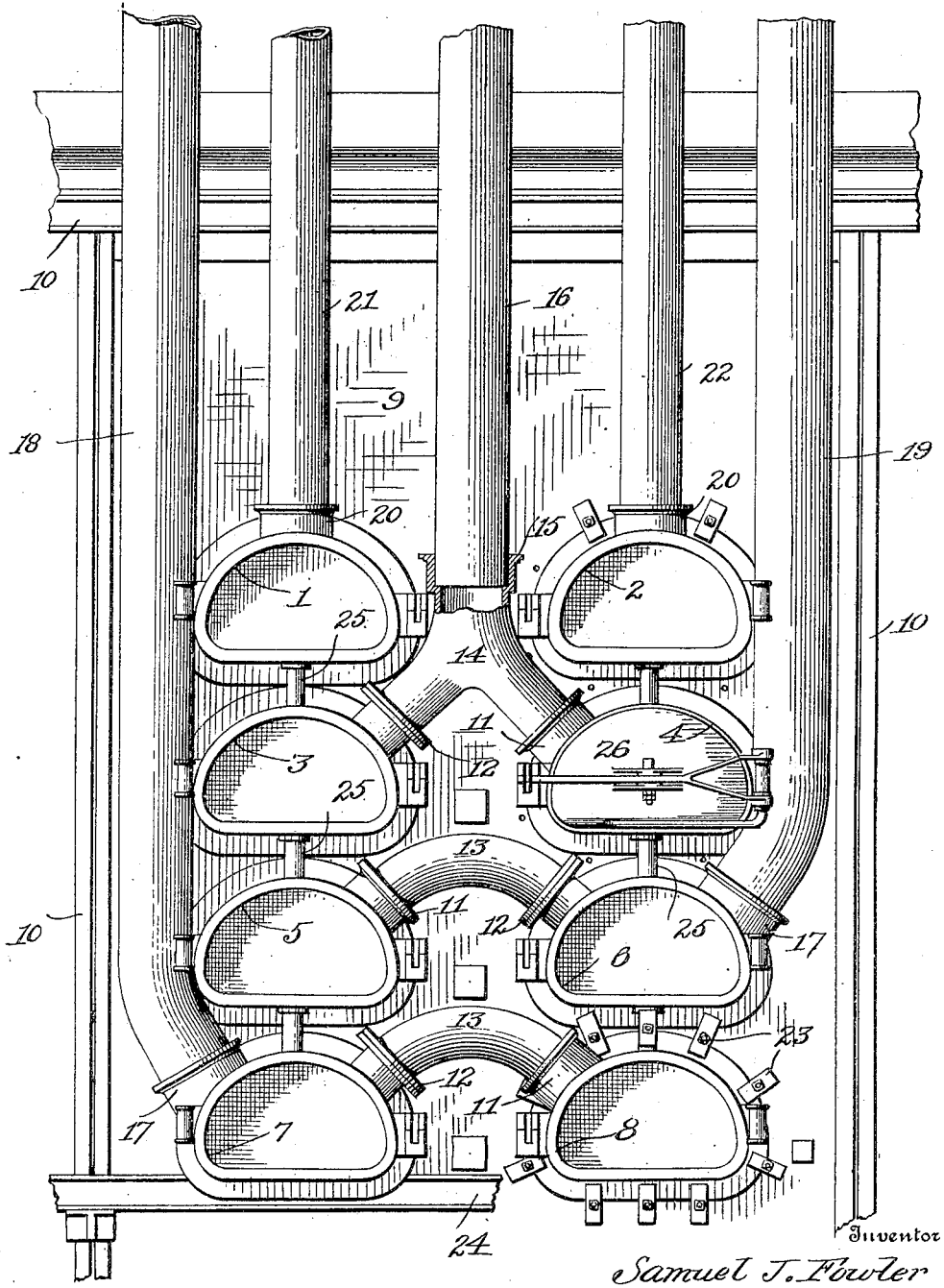

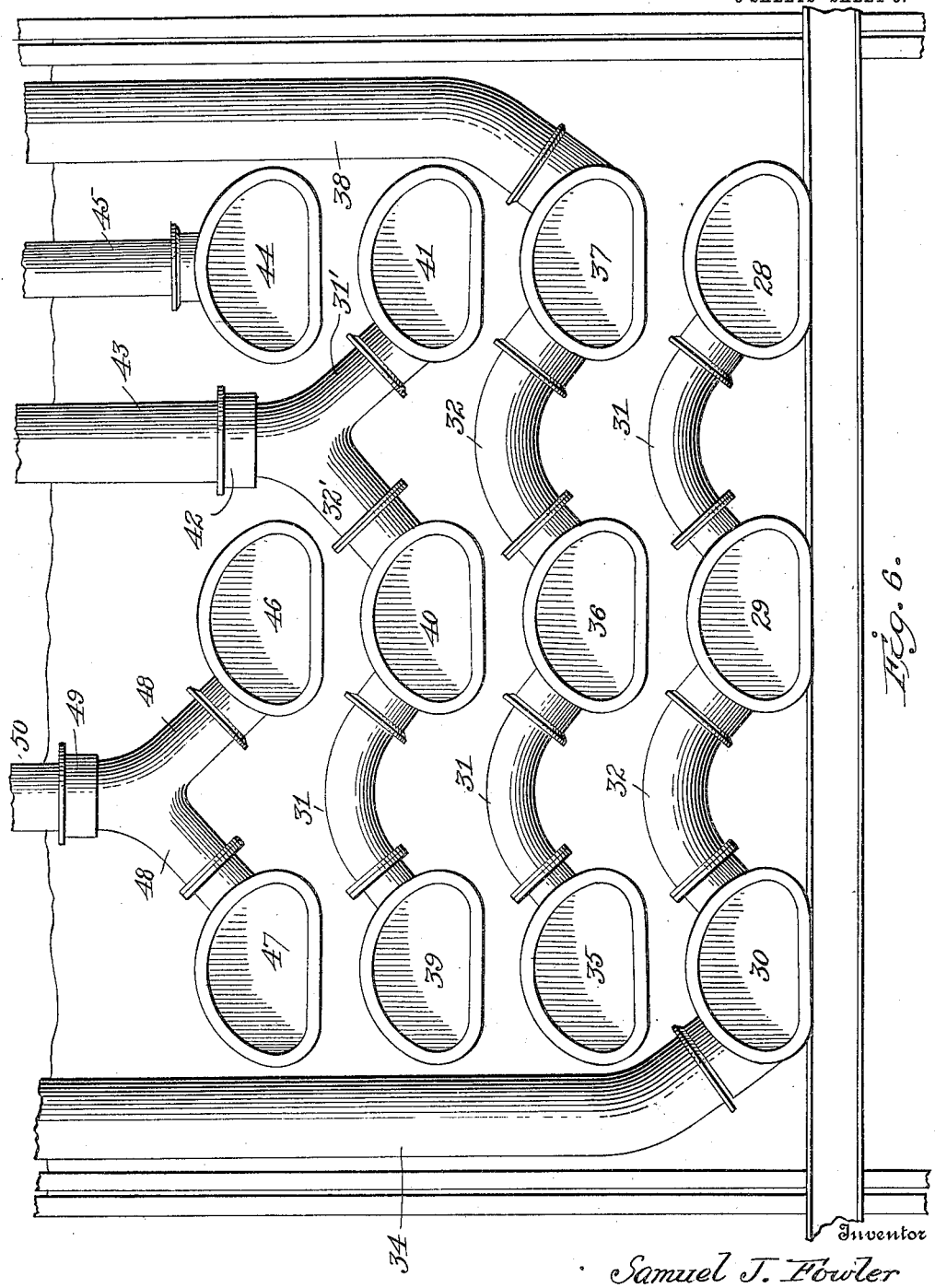

UNITED STATES PATENT OFFICE.

SAMUEL J. FOWLER, OF CAMBRIDGE, MASSACHUSETTS.

STAND-PIPE AND CONNECTION FOR GAS-RETORTS.

No. 808,831. Specification of Letters Patent. Patented Jan. 2, 1906.

Application filed August 31, 1905. Serial No. 276,530.

*To all whom it may concern:*

Be it known that I, SAMUEL J. FOWLER, a citizen of the United States, residing at Cambridge, in the county of Suffolk and State of Massachusetts, have invented certain new and useful Improvements in Arrangements of Stand-Pipes and Connections for Gas-Retorts, of which the following is a specification.

My invention relates to gas-retorts, and more especially to the arrangement of cross connections for the mouthpieces of the retorts and of the stand-pipes connecting the retort-mouthpieces or cross connections with the usual hydraulic main at the top of the setting in order to enable the distilled gas from one set or group of retorts to be conveyed independently and separately from other sets or groups of retorts in the same bench, thereby particularly adapting the same for machine charging and discharging.

The objects of my invention are, first, to construct and arrange the stand-pipes so that the retorts of each set or group of retorts on the same level are connected, by means of cross-mains or horizontal pipes, to the same vertical stand-pipe; second, to arrange the cross pipes or mains and the vertical stand-pipes so that no unnecessary or unusual number of elbows or connections are needed or any of the several pipes interfere with each other or the mouthpieces; third, to arrange the retorts and pipe connections with the mouthpieces so that each set or group of retorts on the same level is entirely independent of the others and making the arrangement especially adapted for the modern machine charging and discharging of gas-retorts; fourth, to reduce the width of arch necessary for making connections between the retorts and the hydraulic main; fifth, to reduce the number of stand-pipes and connections to the hydraulic main for a given number of retorts in a bench; sixth, other evident advantages of the construction and relation of the parts comprising the apparatus, which will hereinafter appear from the detailed description and mode of operating the invention.

The invention consists of structural features and relative arrangements, which will be more clearly described in the body of the specification and particularly pointed out in the appended claims.

In the accompanying three sheets of drawings similar reference characters indicate the same parts throughout the several figures.

In the three sheets of drawings, Figure 1 is a front view of a bench of retorts, showing mouthpieces, stand-pipes, and their cross-connecting pipes embodying features of my invention when applied to eight retorts. Fig. 2 is a side view of the same with a fragment of the housing. Figs. 3, 4, and 5 are sectional views of one-half of the different types of mouthpieces, showing the constructions whereby the stand-pipes or cross-pipes are connected to the same. Fig. 6 is a front view of my invention as applied to a bench comprising twelve retorts, their doors and attaching means being removed.

Referring to Figs. 1 to 5 of the drawings, 1, 2, 3, 4, 5, 6, 7, and 8 are the mouthpieces, suitably secured to the outer end of the retorts 9' 9', which are partially shown and located within the brick housing 9, having the usual reinforcing side, top, and bottom angle or other irons 10. In a "bench" consisting of eight retorts the retorts are arranged in two vertical rows, each row composed of four retorts 1, 3, 5, and 7 or 2, 4, 6, and 8, placed one over the other in vertical line and positioned so that the mouthpieces 1, 3, 5, and 7 are respectively in the same horizontal plane with the mouthpieces 2, 4, 6, and 8. This arrangement of retorts forms four horizontal groups of two retorts each, retorts 7 and 8 forming a lower, 1 and 2 an upper, 5 and 6 a lower intermediate, and 3 and 4 an upper intermediate. The mouthpieces 4, 5, and 8 are provided on the outer portion of their sides nearest to the mouthpieces of the other retort in the same group with integral pipe-end sockets 11 11 11, as shown, for example, in section in Fig. 4, for the purpose of receiving the ends of the pipes or conduits connecting the mouthpiece of a retort in one group with that of the other retort in the same group, to be presently described. The mouthpieces 3, 6, and 7 are provided with integral tubular sections or extensions 12 12 12, provided with flanged ends, as shown in section in Fig. 5, and which are so located as to receive the flange on the other end of the connecting pipes or conduits: 13 13 are the cross-pipes connecting, respectively, the mouthpieces 5 to 6 and 7 to 8 and are provided with flanged ends to engage the flanges of the tubular ends 12 12 and plain ends to be seated and sealed in the sockets 11 11, so as to allow a slight movement, separation, or spreading of the two retorts or mouthpieces of a group due to expansion or contraction caused by the heating and cooling of the retorts. 14 is a three-way pipe or conduit situated between the mouthpieces 1, 2, 3, and 4 and has an end with a flange and another end plain which respectively engage the flanged section 12 of the mouthpiece 3 and the end socket 11 of the mouthpiece 4. The upper end of the three-way pipe is provided with an enlarged socket 15, in which is seated and sealed the lower end of a vertical and central stand-pipe 16, which is of such a cross-section as to easily carry off the gas flowing through the combined branches connected to the mouthpieces 3 and 4. 17 17 are integral extensions or sockets attached (see Figs. 1, 2, and 3) to the mouthpieces 6 and 7 and are similar in construction to the sockets 11, being on an enlarged scale, so as to receive the larger outside vertical stand-pipes 18 and 19, as each of the pipes 18 and 19 carries off the gas pouring from a group consisting of two retorts 7 and 8 or 5 and 6. 20 20 are suitable integral extensions or pipe-sockets on the upper side of the mouthpieces 1 and 2, in which are seated and placed between the stand-pipes 16, 18, and 19 the stand-pipes 21 and 22, which carry off the gas independently from the two upper retorts to the hydraulic main. (Not shown.) 23 23 are bolts and retaining-plates for securing and holding the mouthpieces securely to the face of the retort-housing. 24 is a lower horizontal I-beam secured to the side angle-irons 10 10 and adapted to engage the under side and support the lowest mouthpieces 7 and 8 and superposed weight of stand-pipes and cross connections. 25 25 are short struts interposed between the tops and bottoms of the mouthpieces for supporting the same and mutually contribute to each other to form a solid and firm construction to take their weight and that of the several stand-pipes. 26 shows one of the hinged doors attached to the opening of a mouthpiece, and shown in dotted lines attached to the bottom of each mouthpiece is an inclined plate 27, which is for the purpose of deflecting the coke from the mouthpieces below when discharging a retort.

Referring to the invention when applied to a bench comprising twelve retorts and as illustrated in Fig. 6, the retorts are arranged in three vertical rows, each row composed of four retorts 30, 35, 39, and 47, or 29, 36, 40, and 46, or 28, 37, 41, and 44, placed one over the other in vertical alinement, arranged so that there are formed four horizontal groups—a lower, an upper, and two intermediate groups—one group being over the other and composed of three retorts each. The lower group, consisting of the retorts 28, 29, and 30, is arranged so that 28 and 29 are connected by a pipe 31 and retorts 29 and 30 by a pipe 32. 34 is a vertical stand-pipe which connects the hydraulic main with the retort 30 and is so proportioned as to readily convey the accumulated gas pouring from all three retorts 28, 29, and 30. The lower intermediate group comprises retorts 35, 36, and 37, which are provided with like connections or pipes 31 and 32 as the lower group of retorts, said retorts 37 being connected to the hydraulic main by a vertical stand-pipe 38, similar to pipe 34 on the other side of the bench. The retorts 39, 40, and 41 comprise the upper intermediate group of three retorts. The retorts 39 and 40 are connected by a pipe 31, similar to those heretofore described, while the retorts 40 and 41 are connected by a three-way pipe having its branch 31' connected with retort 41, the branch 32' connected with the retort 40, while the branch 42 communicates with the vertical stand-pipe 43, leading to the hydraulic main. (Not shown.) The upper group, comprising the retorts 44, 46, and 47, are arranged and connected so that the retort 44 is independent and interposed between the stand-pipes 38 and 43 and is provided with a separate vertical stand-pipe 45, leading to the hydraulic main. The two other retorts 46 and 47 or remainder of this upper group are situated between the vertical stand-pipes 34 and 43, and each is connected to one of the branches 48 48 of a three-way pipe which has its other or vertical branch 49 connected to a vertical stand-pipe 50.

The pipes connecting the retorts and the stand-pipes leading from the several groups to the hydraulic main are so proportioned as to easily and readily convey the accumulated gas passing through them without retardation, and I have found in practice for retorts of the usual size that if the connections for conveying the gas of one retort and marked 13, 31, and 31', or stand-pipes 21, 22, and 45, are eight inches in diameter the stand-pipes 16, 18, 19, and 50 or connections 32 32', which carry off the accumulated gas from two retorts, are ten inches, while the stand-pipes 34, 38, and 43, (shown in Fig. 6,) which carry the gas from three retorts to the hydraulic main, are twelve inches in diameter, the gas will flow freely. It will also be seen that the arrangement of the stand-pipes and means of connecting the retorts provides not only a compact form of plant, but one that is easily repaired and kept clean from coal-tar and other impurities. Also the means of supporting the mouthpieces insures a stiff and firm construction which prevents leaky joints and other inconveniences.

From the foregoing detailed description of my invention it will be seen that I have devised an arrangement of stand-pipes and cross connections for gas-retorts which fully and efficiently carries out all the functions recited in the objects of the foregoing statement of the invention, and while I have shown benches comprising eight and twelve retorts this specific relation and number may be modified in many ways without departing from the spirit of my invention, and I wish it to be distinctly understood that I do not limit myself to this precise construction and arrangement of parts hereinbove set forth, and illustrated in the accompanying drawings.

Having now fully described my invention, what I claim as new, and desire to secure by Letters Patent, is as follows:

1. A bench of retorts for the manufacture of coal-gas, comprising a lower, an upper, an upper and a lower intermediate horizontal group of retorts, means for connecting the lower group of retorts, a stand-pipe to one side of the bench of retorts and communicating with an outer retort of the lower group, means for connecting the retorts of the lower intermediate group, a stand-pipe at the other side of the bench and communicating with the outer retort of the intermediate group on the same side as the said stand-pipe, means for connecting the retorts of the upper intermediate group, a stand-pipe interposed between the stand-pipes on the outer sides of the bench and communicating with the upper intermediate group, a stand-pipe interposed between the stand-pipes communicating with the upper and lower intermediate groups and connected with a portion of the retorts in the upper group and means interposed between the stand-pipes communicating with the lower, and the upper intermediate groups for conveying the gas from the remaining portion of retorts in the upper group.

2. An apparatus for the manufacture of coal-gas comprising a bench of retorts arranged in four separate and superposed groups, each group having a plurality of retorts in horizontal alinement, means for connecting the interior of the retorts on the same horizontal line with each other in each of the three lower groups, thereby forming three independently-connected and superposed groups of retorts in three horizontal planes, means for separately connecting each of the three independently-connected groups with a hydraulic main, means for connecting a portion of the retorts in the upper horizontal group with a hydraulic main and a separate means for connecting the remaining portion of the retorts in the upper group with a main.

3. An apparatus for the manufacture of coal-gas comprising a bench of retorts arranged in separate and superposed groups and each group having a plurality of retorts in horizontal alinement and directly over or under the adjacent retort in the next group, a mouthpiece attached to each of said retorts, a vertical strut interposed between the top and bottom of each of the adjacent mouthpieces, means for connecting the interiors of the mouthpieces on the same horizontal line with each other and forming independent groups of retorts in the same plane, and means for independently connecting each group of retorts with a hydraulic main.

In testimony whereof I affix my signature in presence of two witnesses.

SAML. J. FOWLER.

Witnesses:
  GEO. B. WOOD,
  J. W. NOURBOURN